Feb. 24, 1931.  E. E. NOVOTNY  1,793,715
SYNTHETIC RESIN AND METHOD OF MAKING THE SAME
Filed July 31, 1926
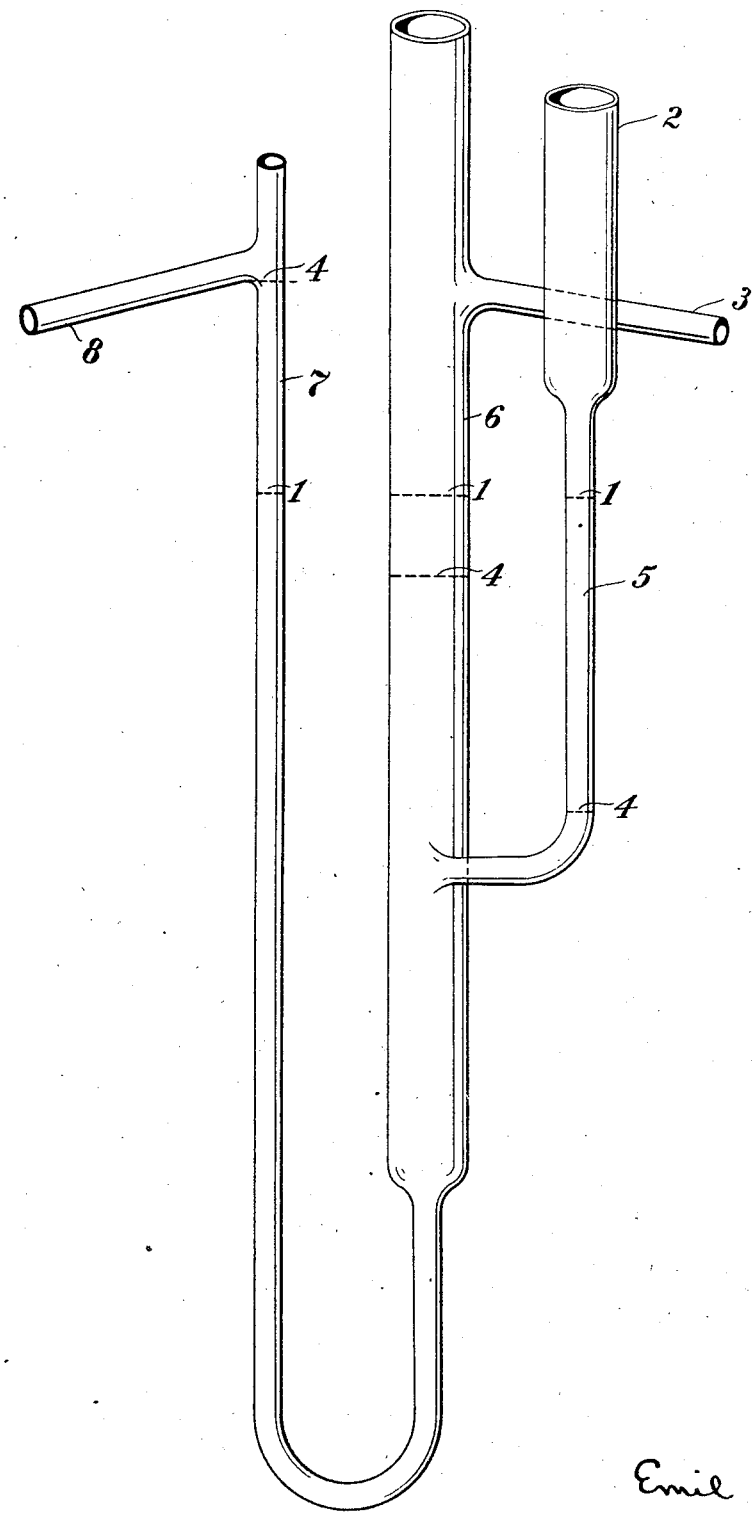
INVENTOR.
Emil E. Novotny
BY Cavanagh + James
ATTORNEYS Patented Feb. 24, 1931

1,793,715

UNITED STATES PATENT OFFICE

EMIL E. NOVOTNY, OF LOGAN, PENNSYLVANIA, ASSIGNOR TO JOHN STOGDELL STOKES, OF SPRING VALLEY FARMS, HUNTINGDON VALLEY P. O., PENNSYLVANIA

SYNTHETIC RESIN AND METHOD OF MAKING THE SAME

Application filed July 31, 1926. Serial No. 126,213.

This invention relates to the process of making synthetic resin and has for its particular object the production of synthetic resin or synthetic resin varnish or lacquer formed through the interaction of xylenols and furfural preferably without the use of a catalytic or condensing agent. These condensation products are in themselves potentially reactive in that they may be kept for a long time in their fusible, soluble condition and will upon subsequent heating be converted to their hard, set and substantially infusible and insoluble condition.

Another object of this invention is the provision of a method for carrying out the reaction between xylenols and furfural at temperatures higher than can be obtained under the usual refluxing conditions. The use of these higher temperatures greatly increases the rate of reaction.

A still further object is to remove the water of solution or reaction as fast as it is vaporized. This not only insures a uniform product, but also eliminates the step of removing the water at the end of the reaction. The usual process of removing water by distillation after a reaction is over tends to produce a very reactive product in the case of the xylenol resins.

Although these condensation or reaction products of xylenols and furfural alone can be converted to their infusible, insoluble form, the reaction is comparatively slow unless either a catalyst or a hardening agent is used in combination with them. It is preferable to combine a hardening agent with these reaction products of xylenols and furfural and this is preferably done without the addition of a condensing or catalytic agent for the reasons to be enumerated in the paragraph following. When this hardening agent is incorporated or combined with these products the reaction becomes more rapid and the product is harder, stronger, and more flexible when finally hardened under either heat or heat and pressure.

While a catalytic agent such as a small amount of base or basic or acid salt or even a trace of acid can be used as a catalytic or condensing agent for either the primary or secondary or final hardening reaction, the presence of these materials even in minute quantities is found to be deleterious to the final end material. If used in combination with the primary reaction in large quantities the condensation or reaction progresses ununiformly throughout the mass and large quantities of the mass are found to be reacted too far, probably resulting in polymerization products incapable of serving the technical use to the best advantage. If a catalyst is used during the second step of the operation when the hardening agent is combined with the initial condensation product the mass tends to go to a rubbery state and therefore great precautions are necessary if the hardening agent is to be thoroughly combined in order that a minimum amount be liberated during the drying and processing operations prior to the final hardening of the product. Small quantities of catalyst at this point, preferably if of a basic nature and preferably in a quantity not greatly exceeding .1% of the weight of the xylenols used, can be satisfactorily used. This application is particularly directed to a specific form of material produced from a commercial grade of tar acids which consist chiefly of xylenols and higher boiling fractions of tar acids which exhibit the ability to combine with various aldehydes without the need of catalytic or condensing agents. The products when so made are well adapted for use in impregnating textiles, paper sheet products of cotton and kraft and when produced in their dry resinous form and finely powdered are very well adapted for incorporation with fibrous pulp-like bodies at the beaters of the paper mill, to be formed into sheets, dried and molded under heat and pressure into various shapes or the dried sheeted products can be ground to form a molding powder. These resins or varnishes can be mixed with various comminuted fillers and directly made into molding compositions or used as resins to be mixed with pyroxlyin lacquers and plastics.

In incorporation at the beaters the xylenols offer advantages not to be found in phenol in that the xylenols are but slightly soluble in water, and as the hardening agent is thoroughly combined, a uniform resinous product may be maintained in the paper sheet during and after incorporation without special precautions having to be taken to treat the beater water with extra phenols or hardening agents. This is of great importance as the final end product will run more uniform from lot to lot as the predetermined combination of materials will be available for the final heating or heating and pressing operation.

These commercial xylenols offer a further advantage in that the condensation products made with them rapidly form a gel and therefore when impregnated or coated on or in the textile or paper product a heavy impregnation may be applied either at one or more operations, and there is little or no tendency to dust or flake off after the sheets have been dried. This gel formation molds very well, forms a solid, homogeneous facing, shows little or no side flow in molding, and therefore aids in the possibility of obtaining products of uniform cross-section.

Although a low grade of phenolic body or tar acid is used, consisting chiefly of xylenols and other higher boiling homologues of phenol, the finished product has all the reactivity necessary when used for the impregnation of asbestos, cotton, paper or wood products and at the same time gives end products superior to those made from high grade phenol both in dielectric and mechanical strengths. The products have greater flexibility than when phenol is used, perhaps due to the inherent qualities of the xylenols but most probably due to the fact that the resin or varnish when dried forms a gel very readily prior to the final molding operation. This gel so envelopes the fibres of the material that the filler is in a more natural and less brittle state and is thoroughly enveloped or encapsulated by the resinous gel and is therefore readily machined, cut or punched even when cold.

The art of synthetic resin molding discloses clearly the fact that molding powders although consisting of cotton or cellulose or mixtures of these or, for that matter, various inorganic fillers, produce end products that are relatively harder and more brittle than products made of similar synthetic resins impregnated or incorporated into textiles, cotton or paper products, the paper products being more readily cut, drilled and punched. This is undoubtedly due to the fact that the long heavy fibres of the paper sheet are not so thoroughly impregnated throughout as when the resin is mixed with comminuted fillers such as, for example, wood flour. The xylenols give resinous products readily forming gels and although both the tensile strength and tensile split tests of the laminated paper products with these resins incorporated are high and the product shows up well under dielectric tests and moisture absorption, they produce an end product having easy machining and cold punching qualities so desirable in a material of this class.

The xylenols and higher boiling fractions of tar acids moreover offer other advantages when combined with furfural or other aldehydes having a lower reactivity at low temperatures than formaldehyde in that these products have a high boiling point and the reaction can be carried out without the use of catalysts and without the use of counteracting pressure as in an autoclave. The use of an autoclave is as a rule dangerous, particularly where high operating pressures are required, and the cost, of course, is higher than for an ordinary digester. It is not to be understood, however, that pressure cannot be used in connection with these materials, but it is found best to operate under ordinary atmospheric pressures as this produces products of more uniform quality. As an illustration, it is possible to combine with these xylenols various carbohydrates such as cellulose, starch, sugar, etc., without the use of counteracting pressure or catalysts.

In order to maintain the high temperature necessary for this reaction where furfural or other aldehydes or substances less reactive than formaldehyde are to be combined therewith, it is essential to eliminate the water of solution and synthetic water of condensation as quickly as formed, particularly in the case of the initial reaction as, for example, the reaction between the xylenols and furfural. With the water of reaction and condensation largely eliminated the reaction rate is uniform throughout the mass and the boiling mixture when furfural is combined is maintained without counteracting pressure at from 360 to 380° F. At this high temperature no catalyst is required if the reaction is conducted for a period of approximately 7½ hours. On the other hand, by adding just a trace of a catalyst, preferably potassium carbonate say not over .36 parts or for that matter the minutest amount of acid such as sulphuric acid say not over .001 parts, the reaction will be hastened considerably and lower temperatures than those mentioned can be used.

The lower the temperature used and the lower the amount of catalyst the lighter will be the color, only that where an acid is used in combination with furfural the products will be black.

The elimination of the catalyst or the use of but a small amount of it makes the control on a large commercial batch a simple matter and products having a uniform viscosity may be produced with unfailing uniformity. This is not at all possible where a large quantity of catalyst is used and a large quantity of catalyst increases moisture absorption and decreases the dielectric strength of the product.

In order to maintain the high reaction temperature during the primary reaction without the use of counteracting pressure, a gravity separator is utilized.

In the accompanying drawing, Fig. 1 shows the separator in elevation, the separator when first used is to be filled with a mixture of xylenol and furfural, using the same proportions and the same materials as are to be used in the digester. When so filled the level of xylenol and furfural balances to the level of the dotted lines indicated at 1. A quantity of water is now added through the inlet tube 2 until some of the water balances and flows out from the water outlet spout 3. The mixture of xylenol and furfural will thereupon seek the level indicated by the dotted lines at 4. In operation the condensed vapors issuing from the digester and distilling condenser (not shown) are allowed to discharge at the separator inlet 2, the drops passing through the receiving tube 5 through a body of water saturated with the reagents and allowed to enter the separating tube 6, the synthetic water rising to the top and flowing from discharge tube 3 into a suitable graduated receptacle (not shown). This graduated receptacle shows at all times the state of the reaction so far as the removal of synthetic water is concerned. The separated mixture consisting chiefly of xylenol and furfural rises in tube 7 and is discharged through the outlet 8 through a U tube (not shown) also filled with this mixture of xylenol and furfural. The U tube stops any vapors from the digester entering into the separator through the outlet pipe. The reactive reagents are thus returned to the zone of reaction after they have been separated from substantially all of the water and are again in condition to combine. In this manner water is removed and the boiling point of the mixture is not materially depressed.

Where the aldehyde mixture is of a non-volatile nature the separator may still be used to good advantage as the water is removed from the phenolic body as it is boiled off and the phenolic body is again returned to the reaction zone.

While the separator is shown in glass and is so actually used in laboratory practice, a large separator similarly balanced made of piping and a reservoir tank, the separator being provided with suitable sight glasses where necessary, is in actual daily use on a digester of over 500 gallon capacity.

In order that my invention may be better understood, the following illustrations are given by way of examples. It is to be understood, however, that considerable departures can be made in the proportions of the reacting ingredients, temperatures, method of operation, etc., and that the reaction may be permitted to take place with or without the use of a catalytic agent.

*Example 1*

Xylenol, commercial grade, 32 parts; furfural, commercial grade, 24 parts. Boil mixture in a digester provided with suitable distilling condenser and separator. Carry out the distillation in such manner that water of solution and synthetic water formed will be removed with the vapors of the reacting ingredients. Maintain the temperature of the reacting mass at between 360 and 380° F. for approximately 7½ hours or for a longer length of time if a harder variety of product is desired. Under the conditions mentioned, however, there will be removed approximately 3 parts of water which is readily read on the graduate placed under the spout of the separator discharge pipe 3. The reacting ingredients are returned to the digester through the separator outlet pipe 8 through the U tube (not shown) and back into the digester. The resin thus formed is potentially reactive but is slow-setting and can at this point be intermixed with various hardening agents such as hexamethylenetetramin, polymerized formaldehyde, furfuramid, furfural, etc., to speed the reaction of the product when it is to be subsequently hardened.

However, it is preferred to actually combine the active methylene radical with this resin product in the following manner: The product in the kettle is cooled to approximately 180° F., the condenser is placed in the reflux position and there is added to the digester contents 10 to 30 parts of 37 to 40% formaldehyde. Heat is again applied and the mixture is boiled while refluxing for from 1 to 2 hours. The condenser is now connected for distillation and the separator is not used. The distillate is discharged into a container and weighed. When 15 parts of distillate have been removed when 20 parts of formaldehyde had been used the digestion is completed. The temperature of the digester contents will be about 258° F. At higher temperatures of say 300° F. or over precautions are necessary as the material may suddenly go infusible.

When the distillation is carried up to high temperatures under precautions or when reduced pressure such as a vacuum is available, the volatile material may be eliminated more thoroughly and a hard resin which is grindable will be produced.

Where a varnish is desired alcohol or a mixture of alcohol, benzol, acetone, furfural and carbon tetrachloride may be added, preferably while the contents of the digester are still in a heated condition. Where alcohol alone is used 19 parts added to the contents of the digester will give a varnish of good consistency for impregnation purposes. The product may be further thinned prior to use.

Furfural is an ideal hardening agent and as it can be stabilized so that it is neutral will not affect the dielectric qualities of the product. It is preferably added in an amount approximating 2% of the resin weight or approximately 1.25 parts; however, larger quantities may be used.

If a lubricant is desirable, various oils, waxes, camphor, stearic acid, calcium stearate, etc., may be added, but it is preferable to use for most purposes stearic acid to the extent of about .5% of the resin weight or approximately .3 parts.

Plasticisers may be added for the purpose of making the product more readily machined, cut and punched while in the cold state. These plasticisers preferably consist of camphor, lanolin and China wood oil or mixtures of these.

However, China wood oil to the extent of from 2 to 5% of the varnish weight is most suitable. This would be approximately 1.5 to 5 parts of the ingredients as mentioned and it is preferably first cut with a solvent such as furfural, benzol or carbon tetrachloride or mixtures of these, using about two times the weight of the China wood oil used and added to the mass preferably after the alcohol had been added. It is to be understood, however, that these plasticisers may be added at any time prior to, during or at the end of the reaction. The solvent for the wood oil is added in order to carry this material in solution with the varnish body. Plasticisers not readily soluble in the resin or varnish can be impregnated into the paper or textile material prior to the varnish impregnation operation or into comminuted fillers such as wood flour. Similarly these may be incorporated with the resin, at the beaters of the paper mill or with the resins and fillers before the mixing, rolling or molding operations where a molding composition is made by rolling on differential rolls.

The following example illustrates the method of operating this reaction using a small amount of basic catalyst:

*Example 2*

Xylenol commercial grade 72 parts; furfural commercial grade 36 parts; potassium carbonate .36 parts. These ingredients are placed into a digester provided with a condenser and the separator previously described. Vigorous stirring is maintained throughout the reaction or until the resin or varnish is discharged from the digester. The contents of the digester are heated to approximately 300° F when a vigorous reaction ensues which lasts for about fifteen minutes. Thereupon the separation of synthetic water occurs, becoming more marked as the mass in the kettle reaches a temperature of approximately 317° F. and continues until an equilibrium has been established at approximately 320° F. This reaction cycle will take approximately ½ to 1 hour and there will be separated approximately 3% to 6% or 3 to 6 parts of water. The function of the separator is to return the uncombined materials into the kettle with the elimination of the largest part of water of solution and condensation as explained in Example 1. To the product in the digester as described above add formaldehyde commercial 37 to 40% strength 33.6 parts. Boil under a reflux condenser for one hour or until a product having the desired viscosity is obtained. Thereupon distill off approximately 12% of the water of solution and condensation of the total weight of digester contents at the time the formaldehyde is added. The product is but moderately reactive and the distillation can be conducted until a maximum temperature of about 230° F. has been reached; whereupon a suitable quantity of solvent is added such as No. 5 denatured alcohol 42 parts in order to stop the reaction and to quickly reduce the viscosity of the mass.

If the primary reaction between the xylenol and furfural as given in Example 2 were carried out under ordinary reflux conditions, the boiling point of the mass would be approximately 270° F. The reaction would be started but as synthetic water formed in larger quantities the boiling point of the mass would be depressed until a temperature of about 220° F. were reached. Under this range of temperatures the reaction would be very incomplete and the loss of reagents would make such a procedure economically prohibitive. With a large quantity of catalyst a greater amount of the reagents could be combined under the conditions just mentioned, but the added catalyst would be objectionable in the final product and would of necessity have to be removed by either washing or neutralization, both methods being quite expensive. This large quantity of catalyst, furthermore, if retained with the primary condensation product of xylenol and furfural would make the subsequent reaction where the formaldehyde is combined with the primary reaction product too energetic where large commercial quantities of material are to be operated upon.

The primary reaction could likewise be carried out in a digester with a condenser arranged for distillation and the synthetic water and other reagents caused to be removed from the reaction vessel when a boiling point of about 316° F. could be maintained. This is, however, not an ideal method as the proportion of the reacting ingredients could not be maintained uniformly because of the elimination of certain of the active ingredients through distillation.

It will therefore be noted that the object is to so regulate the temperature and method of reaction between the phenolic body and furfural in that a resinous product of a fusible, soluble nature will be produced having improved penetrating qualities and having high dielectric and mechanical strength and so maintaining the operation of the digester that the reacting ingredients may be caused to combine at a uniform rate of speed and under conditions of predetermined reagent proportions.

Although the end product of the reaction when a phenolic body high in xylenols is combined with furfural is ordinarily of a relatively low melting point, it is to be understood that by proper distillation and duration of reaction, products of high melting points can be made in condition so that they are grindable.

Instead of utilizing the .36 parts of potassium carbonate other bases can be used such as, for example, sodium carbonate, potassium and sodium hydroxides, all of which are preferably used in relatively small quantities; furthermore, various basic and acid salts, and it is even possible to use acids themselves for the primary condensation between the xylenol and furfural only that when these acids are used the quantity must be extremely small. For example, when sulphuric acid is used it should not greatly exceed .001% of the phenolic body, and hydrochloric acid is even more energetic.

Although ordinary commercial formaldehyde of 37 to 40% strength is preferred as the active methylene body to combine with the reaction product of xylenol and furfural, it is to be understood that gaseous formaldehyde, polymerized formaldehyde in its various forms and, for that matter, other active methylene containing bodies may be used. It is the preferred practice to use xylenols as the phenolic body because of their high boiling points and high reactivity without the need of a catalytic agent. These xylenols contain certain proportions of lower and higher boiling phenolic bodies and likewise phenolic bodies having higher boiling points than the xylenols may be utilized for the production of these resinous products.

Although the resinous products produced by the methods described herein are particularly adapted for use in the process of making laminated sheet-like materials of paper and textiles, it is to be understood that for certain purposes the products may be utilized when mixed with various filling materials of an organic or inorganic nature producing molding compositions of the comminuted or sheet plastic form.

The addition of dyes, colors, pigments, etc., may be made to the resinous condensation products or varnishes before, during or after the reaction. The pigments are preferably added in colloidal suspension.

The use of furfural and formaldehyde and the proportion of these to the amount of xylenol used may be varied considerably, producing products of varying degrees of hardness and strength. Likewise, the reaction between the furfural and xylenol may be conducted at the same time that the reaction is carried out with the formaldehyde or for that matter the formaldehyde may be caused to combine with the xylenol prior to the reaction with the furfural.

Wherein I have shown that the varnish is preferably an alcohol solution it is to be understood that the reaction may be carried to the point where the products are no longer soluble in alcohol but soluble only in acetone, furfural, etc., in order that products more highly polymerized may be used and thereby the penetration into the fibres controlled. For example, where products insoluble in alcohol are to be made the reaction is carried out to the point where the alcohol would be added and acetone or furfural may be added instead and the condensation continued to the point where the product is no longer soluble in a solvent such as alcohol or acetone.

It is to be understood that these resinous condensation products of xylenols, furfural and formaldehyde are soluble in 15% alkaline solutions such as sodium or potassium hydroxide and that they can be precipitated out of solution by the use of a suitable quantity of acid or, for that matter, alum such as ordinary potassium alum. These resinous products when in suitable form either in solution or in finely comminuted particles, may be incorporated with various spun or woven textile or paper products at the time such products are being formed or at any preferred time thereafter. When so combined with these textile products they act as reinforcing cementitious materials which may be subsequently reacted under heat or heat and pressure to their final infusible form. For certain classes of work where solvent recovery is not possible it is preferable to introduce these resinous products into these textile or paper products by direct incorporation methods at a considerable saving in the cost of solvent.

What I claim is—

1. The herein described method of making a potentially reactive resinous reaction product of xylenols and furfural, which comprises subjecting a mixture of these ingredients to a higher temperature than 212° F. and removing the water of solution and reaction as fast as vaporized.

2. The herein described method of making a potentially reactive resinous product of xylenols and furfural which comprises subjecting a mixture of such ingredients to a temperature at which the water of solution and reaction will distill, and removing the same as fast as vaporized and returning the reactive ingredients to the zone of reaction.

3. The herein described method of making a potentially reactive resinous product of xylenols and furfural, which comprises subjecting a mixture of such ingredients to a higher temperature than 212° F., removing the water of solution and reaction substantially as fast as vaporized, returning the reactive ingredients to the zone of reaction, and combining formaldehyde with said reaction product while maintaining the resin in a fusible state.

4. The herein described method of making a potentially reactive resinous product of xylenols and furfural, which comprises subjecting a mixture of such ingredients to a higher temperature than 212° F., removing the water of solution and reaction substantially as fast as vaporized, returning the reactive ingredients to the zone of reaction, and combining a methylene containing hardening agent with the reaction product.

Signed at Philadelphia, in the county of Philadelphia and State of Pennsylvania, this 30th day of July, A. D., 1926.

EMIL E. NOVOTNY.